US012753019B2

(12) United States Patent
Luer et al.

(10) Patent No.: US 12,753,019 B2
(45) Date of Patent: Oct. 6, 2026

(54) CONVEYOR SENSOR

(71) Applicant: Banner Engineering Corp., Minneapolis, MN (US)

(72) Inventors: Dennis R. Luer, Maple Grove, MN (US); Richard C. Bragg, Edina, MN (US)

(73) Assignee: Banner Engineering Corp., Minneapolis, MN (US)

( * ) Notice: Subject to any disclaimer, the term of this patent is extended or adjusted under 35 U.S.C. 154(b) by 106 days.

(21) Appl. No.: 18/806,425

(22) Filed: Aug. 15, 2024

(65) Prior Publication Data

US 2024/0409323 A1 Dec. 12, 2024

Related U.S. Application Data

(63) Continuation of application No. 18/141,135, filed on Apr. 28, 2023, now Pat. No. 12,065,314, which is a
(Continued)

(51) Int. Cl.
*B65G 43/08* (2006.01)
*B65G 13/00* (2006.01)
(Continued)

(52) U.S. Cl.
CPC ............. *B65G 43/08* (2013.01); *B65G 13/00* (2013.01); *B65G 15/64* (2013.01); *B65G 39/16* (2013.01);
(Continued)

(58) Field of Classification Search
CPC .. B65G 13/00–12; B65G 43/00; B65G 43/08; B65G 2203/04–046
See application file for complete search history.

(56) References Cited

U.S. PATENT DOCUMENTS

| | | | |
|---|---|---|---|
| 3,669,472 | A | 6/1972 | Nadsady et al. |
| 4,240,538 | A | 12/1980 | Hawkes et al. |

(Continued)

FOREIGN PATENT DOCUMENTS

| | | |
|---|---|---|
| BR | 302014001464 | 2/2015 |
| BR | 302014001465 | 2/2015 |

(Continued)

OTHER PUBLICATIONS

Banner, announced 2025 [online], [site visited Sep. 8, 2025]. Avail from int, URL: https://www.bannerengineering.com/us/en/products/part.810975.html (Year: 2025).

(Continued)

*Primary Examiner* — Gene O Crawford
*Assistant Examiner* — Keith R Campbell
(74) *Attorney, Agent, or Firm* — Mueting Raasch Group

(57) ABSTRACT

Some embodiments of the technology disclosed herein relate to a sensor device. An elongate sleeve has a first end and a second end and extends along a longitudinal axis. A plurality of sensors are fixed relative to the sleeve. A first endcap is coupled to the first end, where the first endcap has an endcap body. A first axle is coupled to the endcap body, where the first axle extends along the longitudinal axis and the first axle defines a retaining feature. An intermediate component is coupled to the first axle, and the intermediate component is selectively rotatable about the longitudinal axis. The sensor device has an orientation locking structure that is configured to be engaged to selectively fix the orientation of the intermediate component about the longitudinal axis relative to the endcap body.

20 Claims, 12 Drawing Sheets

Related U.S. Application Data continuation of application No. 17/085,243, filed on Oct. 30, 2020, now Pat. No. 11,667,473, which is a continuation of application No. 16/448,937, filed on Jun. 21, 2019, now Pat. No. 10,850,928.

(51) Int. Cl.

| | |
|---|---|
| ***B65G 15/64*** | (2006.01) |
| ***B65G 39/16*** | (2006.01) |
| ***B65G 43/02*** | (2006.01) |

(52) U.S. Cl.

CPC ........ *B65G 43/02* (2013.01); *B65G 2203/042* (2013.01); *B65G 2812/02168* (2013.01)

(56) References Cited

U.S. PATENT DOCUMENTS

| | | | | |
|---|---|---|---|---|
| 4,854,443 | A | 8/1989 | Gordon | |
| 5,862,907 | A | 1/1999 | Taylor | |
| 5,906,268 | A | 5/1999 | Kalm | |
| 6,042,430 | A | 3/2000 | Hallick | |
| 6,612,422 | B2 | 9/2003 | Roberts et al. | |
| 7,007,792 | B1 | 3/2006 | Burch | |
| 7,832,719 | B2 | 11/2010 | Van Den Berg | |
| 8,284,993 | B2 | 10/2012 | Taylor et al. | |
| 8,978,878 | B2 * | 3/2015 | De Martin ............. | B65G 43/08 198/781.05 |
| D735,061 | S | 7/2015 | Laforest | |
| D735,590 | S | 8/2015 | Laforest | |
| D863,368 | S | 10/2019 | Abramczyk | |
| D880,098 | S | 3/2020 | Harrison | |
| 11,390,465 | B2 * | 7/2022 | Chuang .................. | B65G 43/08 |
| D1,083,279 | S | 7/2025 | DeVries | |
| 2004/0173440 | A1 | 9/2004 | Mauch et al. | |
| 2007/0181406 | A1 | 8/2007 | Swoboda | |
| 2009/0120766 | A1 | 5/2009 | Markle et al. | |
| 2011/0297509 | A1 | 12/2011 | Taylor | |
| 2013/0140131 | A1 | 6/2013 | Kaminski et al. | |
| 2016/0300469 | A1 | 10/2016 | Hood | |
| 2017/0123057 | A1 | 5/2017 | Prinz et al. | |
| 2025/0091815 | A1 * | 3/2025 | Itoh ........................ | B65G 13/07 |

FOREIGN PATENT DOCUMENTS

| | | | |
|---|---|---|---|
| GB | 2281125 | A | 2/1995 |
| KR | 3020070049140 | | 9/2008 |
| WO | WO 2002/098768 | A1 | 12/2002 |
| WO | WO 2006/096292 | A1 | 9/2006 |
| WO | WO 2011/104589 | A1 | 9/2011 |

OTHER PUBLICATIONS

European Patent Application No. 25183661.5, filed Jun. 18, 2025; Extended 2 European Search Report issued Nov. 24, 2025; 23 pages.

U.S. Appl. No. 16/448,937, filed Jun. 21, 2019, Luer et al.

U.S. Appl. No. 17/085,243, filed Oct. 30, 2020, Luer et al.

U.S. Appl. No. 18/141,135, filed Apr. 28, 2023, Luer et al.

"OsiSense™ XUY Roller Sensor" Datasheet, Telemecanique Sensors, Schneider Electric CA, Rueil-Malmaison, France, 2014; 2 pages.

International Search Report and Written Opinion for International Application No. PCT/US2020/038780, mailed Oct. 28, 2020, 13 pages.

* cited by examiner

CONVEYOR SENSOR

RELATED PATENT DOCUMENTS

This application is a continuation of U.S. patent application Ser. No. 18/141,135, filed Apr. 28, 2023, which is a continuation of U.S. patent application Ser. No. 17/085,243, filed Oct. 30, 2020, now U.S. Pat. No. 11,667,473, which is a continuation of U.S. patent application Ser. No. 16/448,937, filed Jun. 21, 2019, now U.S. Pat. No. 10,850,928, the disclosure of each of which is incorporated herein by reference thereto.

TECHNOLOGICAL FIELD

The present disclosure is generally related to a sensor. More particularly, the present disclosure is related to a conveyor sensor.

SUMMARY

Some embodiments of the technology disclosed herein relate to a sensor device. An elongate sleeve has a first end and a second end and extends along a longitudinal axis. A plurality of sensors are fixed relative to the sleeve. A first endcap is coupled to the first end, where the first endcap has an endcap body. A first axle is coupled to the endcap body, where the first axle extends along the longitudinal axis and the first axle defines a retaining feature. An intermediate component is coupled to the first axle, and the intermediate component is selectively rotatable about the longitudinal axis. The sensor device has an orientation locking structure that is configured to be engaged to selectively fix the orientation of the intermediate component about the longitudinal axis relative to the endcap body.

In some such embodiments, the intermediate component is linearly translatable relative to the endcap body along the first axle, is freely rotatable about the longitudinal axis when the intermediate component is in a first linear position relative to the endcap body and has a fixed orientation about the longitudinal axis when the intermediate component is in a second linear position relative to the endcap body. Additionally or alternatively, the endcap body has the first axle, where the intermediate component is rotatably disposed about the first axle between the endcap body and the retaining feature, and the intermediate component is linearly translatable between the endcap body and the retaining feature.

Additionally or alternatively, the intermediate component has the first axle, where the endcap body is rotatably disposed about the first axle between the intermediate component and the retaining feature and the endcap body is linearly translatable between the intermediate component and the retaining feature. Additionally or alternatively, the retaining feature extends radially outward from a distal end of the first axle. Additionally or alternatively, the intermediate component and the first endcap mutually define the orientation locking structure that selectively engages when the intermediate component is in the second linear position. Additionally or alternatively, the orientation locking structure selectively engages in a plurality of fixed orientations about the first axle when the intermediate component is in the second linear position relative to the endcap body.

Additionally or alternatively, the orientation locking structure has a first protrusion extending outward from the endcap body and a series of protrusion receptacles defined by the intermediate component, where the first protrusion has a radial position relative to the longitudinal axis, and each of the protrusion receptacles in the series of protrusion receptacles are in circumferential alignment with the first protrusion to selectively receive the first protrusion. Additionally or alternatively, the first protrusion extends longitudinally outward from a distal end of the endcap body. Additionally or alternatively, the series of protrusion receptacles are defined by an inner region of the intermediate component.

Additionally or alternatively, the orientation locking structure has a first protrusion extending outward from the intermediate component and a series of protrusion receptacles defined by the endcap body, where the first protrusion has a radial position relative to the longitudinal axis, and each of the protrusion receptacles in the series of protrusion receptacles are each in circumferential alignment with the first protrusion to selectively receive the first protrusion. Additionally or alternatively, the first protrusion extends longitudinally inward from a proximal end of the intermediate component. Additionally or alternatively, the series of protrusion receptacles are defined by an inner region of the endcap body.

Additionally or alternatively, the orientation locking structure has a first protrusion, a first protrusion receptacle defined by the intermediate component and a second protrusion receptacle defined by the endcap body, where the first protrusion receptacle and the second protrusion receptacle are configured to mutually receive the first protrusion. The intermediate component defines a series of protrusion receptacles in circumferential alignment with the first protrusion receptacle. Additionally or alternatively, each of the plurality of sensors are linearly aligned relative to each other. Additionally or alternatively, each of the plurality of sensors are linearly aligned parallel to the longitudinal axis.

Additionally or alternatively, a second endcap is coupled to the second end of the sleeve, where the second endcap has a rail coupler that is freely rotatable relative to the sleeve. Additionally or alternatively, the rail coupler defines a polygonal protrusion and a circular protrusion, each extending longitudinally outward from a distal end of the second endcap. Additionally or alternatively, the polygonal protrusion is hexagonal. Additionally or alternatively, the second endcap has a rod translatably disposed in the sleeve and a spring compressibly disposed between the rod and the sleeve, where the rail coupler is rotatably coupled to the rod about a second axle. Additionally or alternatively, the second axle defines a retaining feature configured to retain the rail coupler thereon. Additionally or alternatively, the intermediate component defines a polygonal protrusion configured to receive a corresponding opening in a conveyor rail. Additionally or alternatively, the polygonal protrusion is hexagonal.

In some example configurations disclosed herein, a sensor device has an elongate sleeve extending along a longitudinal axis, where the elongate sleeve has a first end and a second end. A plurality of sensors are fixed relative to the sleeve, a first endcap has an endcap body coupled to the first end, and an intermediate component is coupled to the first endcap, where the intermediate component is selectively rotatable about the longitudinal axis relative to the endcap body.

In some such embodiments, the sensor device has an orientation locking structure configured to be engaged to selectively fix the orientation of the intermediate component about the longitudinal axis relative to the endcap body. In some of those embodiments, the orientation locking structure is configured to be engaged to selectively fix the intermediate component in each of a plurality of fixed orientations about the longitudinal axis relative to the endcap body. Additionally or alternatively, the intermediate component is linearly translatable relative to the endcap body along the longitudinal axis between a first linear position defining a particular maximum linear distance between the endcap body and the intermediate component and a second linear position defining a minimum linear distance between the endcap body and the intermediate component, where the intermediate component is freely rotatable in the first linear position and the intermediate component has a fixed orientation about the longitudinal axis in the second linear position. Additionally or alternatively, a first axle extends along the longitudinal axis, where the endcap body and the intermediate component are coupled to the first axle.

Additionally or alternatively, the first endcap has a first axle extending along the longitudinal axis, where the intermediate component is slidably and rotatably disposed on the first axle and the first axle has a retaining feature configured to retain the intermediate component on the first axle. In the first linear position the intermediate component abuts the retaining feature and in the second linear position the intermediate component abuts the endcap body. Additionally or alternatively the intermediate component has a first axle extending along the longitudinal axis and the endcap body is slidably and rotatably disposed on the first axle, where the first axle has a retaining feature on a distal end configured to retain the endcap body on the first axle. In the first linear position the endcap body abuts the retaining feature and in the second linear position the intermediate component abuts the endcap body.

Additionally or alternatively, the retaining feature extends radially outward from a distal end of the first axle. Additionally or alternatively, the intermediate component and the first endcap mutually define an orientation locking structure that selectively engages when the intermediate component is in the second linear position and disengages in the first linear position. Additionally or alternatively, the orientation locking structure selectively engages in a plurality of fixed orientations about longitudinal axis when the intermediate component is in the second linear position relative to the endcap body. Additionally or alternatively, the sensor device has a second endcap coupled to the second end of the sleeve, where the second endcap has a rail coupler that is freely rotatable relative to the sleeve.

Additionally or alternatively, the orientation locking structure has a first protrusion extending outward from the endcap body and a series of protrusion receptacles defined by the intermediate component, where the first protrusion has a radial position relative to the longitudinal axis and each of the protrusion receptacles in the series of protrusion receptacles are in circumferential alignment with the first protrusion to selectively receive the first protrusion. Additionally or alternatively, the first protrusion extends longitudinally outward from a distal end of the endcap body. Additionally or alternatively, the series of protrusion receptacles are defined by an inner region of the intermediate component.

Additionally or alternatively, the orientation locking structure has a first protrusion extending from the intermediate component and a series of protrusion receptacles defined by the endcap body, where the first protrusion has a radial position relative the longitudinal axis and each of the protrusion receptacles in the series of protrusion receptacles are in circumferential alignment with the first protrusion to selectively receive the first protrusion. Additionally or alternatively, the first protrusion extends longitudinally inward from the intermediate component. Additionally or alternatively, the series of protrusion receptacles are defined by an inner region of the endcap body.

Additionally or alternatively, the orientation locking structure has a first protrusion, a first protrusion receptacle defined by the intermediate component, and a second protrusion receptacle defined by the endcap body, where the first protrusion receptacle and the second protrusion receptacle are configured to mutually receive the first protrusion. Additionally or alternatively, the intermediate component defines a series of protrusion receptacles in circumferential alignment with the first protrusion receptacle.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Figure 9:
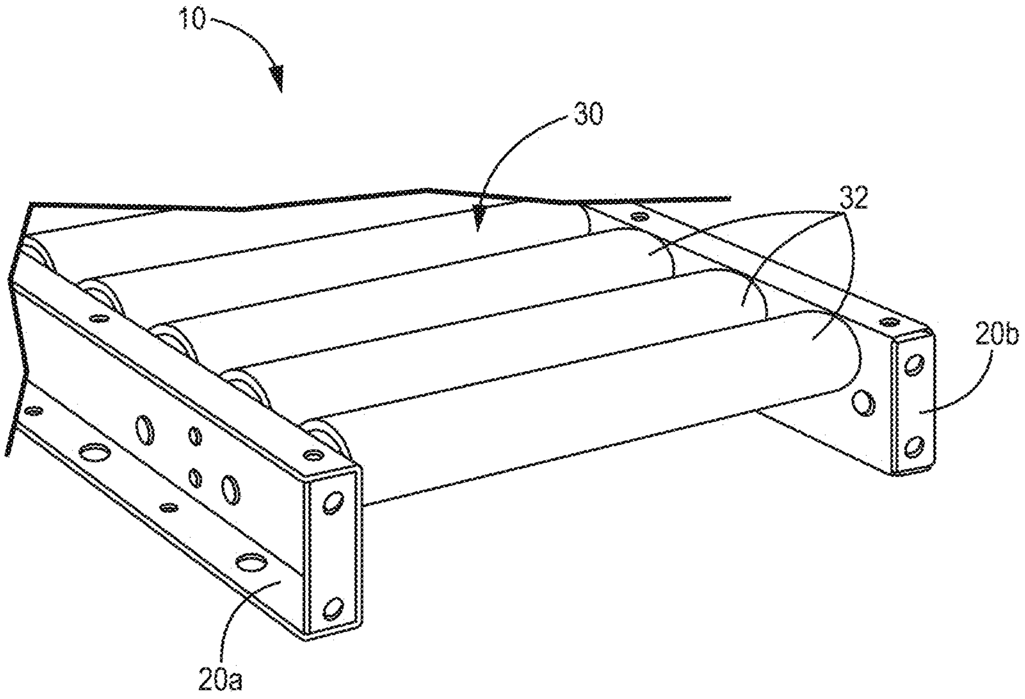
FIG. 9 depicts a partial perspective view of an example conveyor line, consistent with some implementations of the technology disclosed herein.

The technology disclosed herein generally relates to a sensor device that is configured to be positioned in a conveyor line such as, for example, a portion of a conveyor line 10 depicted in FIG. 9. The conveyor line 10 can have a conveyor surface 30, here defined by a plurality of rollers 32, that is disposed between two conveyor siderails 20*a*, 20*b*. The sensor device is configured to be coupled to the opposite siderails 20*a*, 20*b* along the conveyor line 10. In various embodiments the sensor device is configured to be positioned below the conveyor surface 30 to avoid contact with objects conveyed over the conveyor surface 30. The sensor device can be manually manipulated to be fixed in each of a plurality of particular orientations about its longitudinal axis such that the orientation of the plurality of sensors can be selected by a user. Advantageously, the sensor device itself incorporates components that interface with the siderails, which can simplify adjustability of the sensor device.

Figure 1:
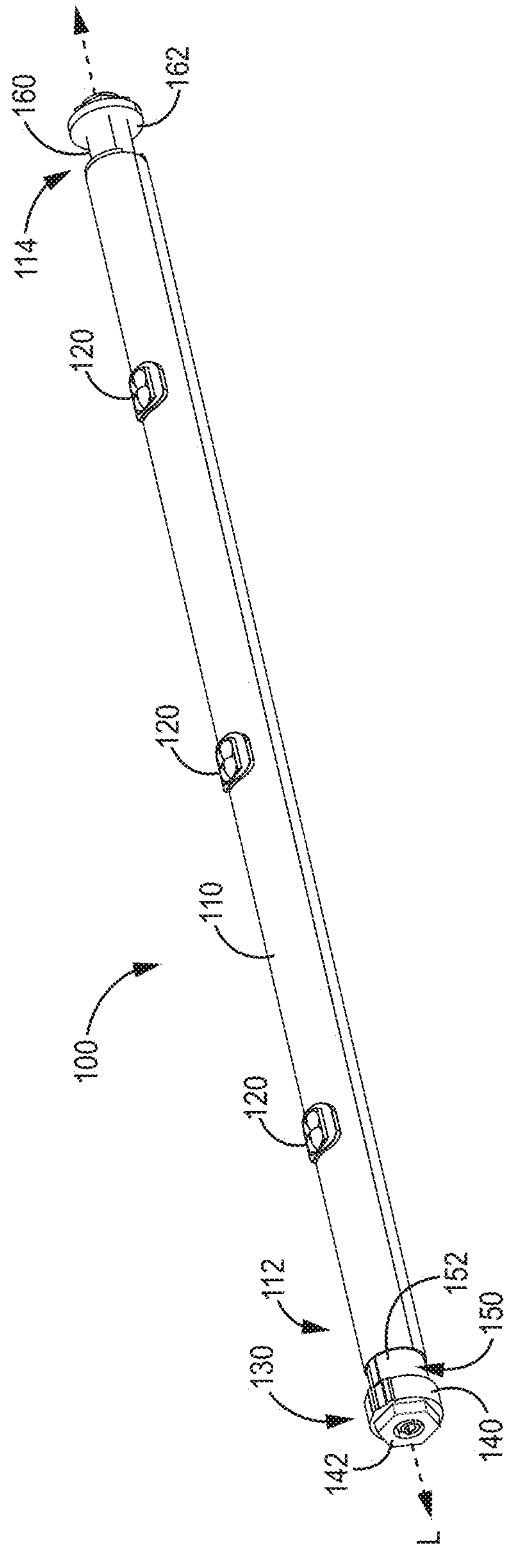
FIG. 1 is an example sensor device consistent with some embodiments of the technology disclosed herein.

FIG. 1 is an example sensor device consistent with some embodiments of the technology disclosed herein. The sensor device 100 can generally be configured to be installed between conveying rollers of a conveyor line. The sensor device 100 can generally be configured to sense objects traversing a conveyor line. The sensor device 100 generally has an elongate sleeve 110, a plurality of sensors 120 fixed relative to the sleeve 110, a first endcap assembly 130 coupled to the elongate sleeve 110, and a second endcap 160 coupled to the elongate sleeve 110.

The elongate sleeve 110 is generally configured to couple to the plurality of sensors 120 and extend across a conveyor line. The sensors 120 are at a particular orientation about a longitudinal axis L. The elongate sleeve 110 generally extends along the longitudinal axis L. The elongate sleeve 110 has a first end 112 and a second end 114. The second end 114 is generally opposite the first end 112. In the current example the elongate sleeve 110 is generally cylindrical with a circular cross-section. in other embodiments the elongate sleeve 110 can define a prism with a polygonal cross-section. In some other embodiments the elongate sleeve 110 can define an elliptical cylinder. Other shapes are certainly contemplated.

The plurality of sensors 120 that are fixed relative to the sleeve 110 can be a variety of different types and combinations of sensors. In some embodiments an ultrasonic sensor is at least one of the plurality of sensors 120. In some embodiments a photoelectric sensor is at least one of the plurality of sensors 120. In some embodiments at least one of the plurality of sensors 120 is a proximity sensor. In some embodiments, an accelerometer is at least one of the plurality of sensors 120. In various embodiments, at least a portion of each of the plurality of sensors is housed by the elongate sleeve 110. In the current example, each of the plurality of sensors 120 are linearly aligned relative to each other. In some alternate embodiments, one or more of the plurality of sensors is not aligned with another one of the plurality of sensors. Furthermore, in the current example, each of the plurality of sensors 120 are linearly aligned parallel to the longitudinal axis L.

The first endcap assembly 130 is coupled to the first end 112 of the sleeve 110. The first endcap assembly 130 can have a first endcap 150 and an intermediate component 140. The first endcap 150 is coupled to the first end 112 of the sleeve 110. In the current example, the first endcap 150 is configured, at least in part, to provide an obstruction through the first end 112 of the sleeve 110. In some embodiments, the first endcap 150 forms a frictional fit with the first end 112 of the sleeve 110. The first endcap 150 generally has an endcap body 151. The first endcap 150 will be described in more detail below with reference to FIGS. 2 and 3.

The intermediate component 140 is generally configured to couple the first end 112 of the sleeve 110 to a conveyor system, such as a conveyor rail. The intermediate component 140 is generally configured to selectively rotate relative to the first endcap 150 and the sleeve 110. For example, the intermediate component 140 is freely rotatable about the longitudinal axis L relative to the first endcap 150 in a first position, and, in a second position, the intermediate component 140 is non-rotatable about the longitudinal axis L relative to the first endcap 150. Such functionality and configurations will be described in more detail below.

In the current example, the intermediate component 140 defines a rail mating feature 142 that is configured to mate with a corresponding surface defined by the conveyor rail. In the current example, the rail mating feature 142 is a protrusion that extends longitudinally outward from the sleeve 110. The protrusion can be a polygonal protrusion such as, in the example depicted, a hexagonal protrusion. The hexagonal protrusion can be configured to mate with a corresponding hexagonal recess defined by the conveyor rail. In some other embodiments the mating feature can be a recess that is configured to receive a corresponding protrusion of a conveyor rail. Example structures of the intermediate component 140 will be described in more detail below.

The second endcap 160 is coupled to the second end 114 of the sleeve 110. In the current example, the second endcap 160 is generally configured to, at least in part, provide an obstruction through the second end 114 of the sleeve 110. The second endcap 160 has a rail coupler 162 that is generally freely rotatable about the longitudinal axis L relative to the sleeve 110. Example structures and configurations consistent with the second endcap 160 will be described in more detail below.

When the sensor device 100 is properly installed between conveyor rails (such as conveyor siderails 20*a* and 20*b* depicted in FIG. 9) in a conveyor line and the intermediate component 140 is in the first position (enabling relative rotation between the intermediate component 140 and the sleeve 110), a user can rotate the sleeve 110 relative to the intermediate component 140 and the rail coupler 162 to position the plurality of sensors 120 in the desired orientation about the longitudinal axis L. When the desired orientation of the plurality of sensors 120 is achieved, the intermediate component 140 can be shifted to the second position, such that the sleeve 110 is non-rotatable relative to the intermediate component 140.

Figure 2:
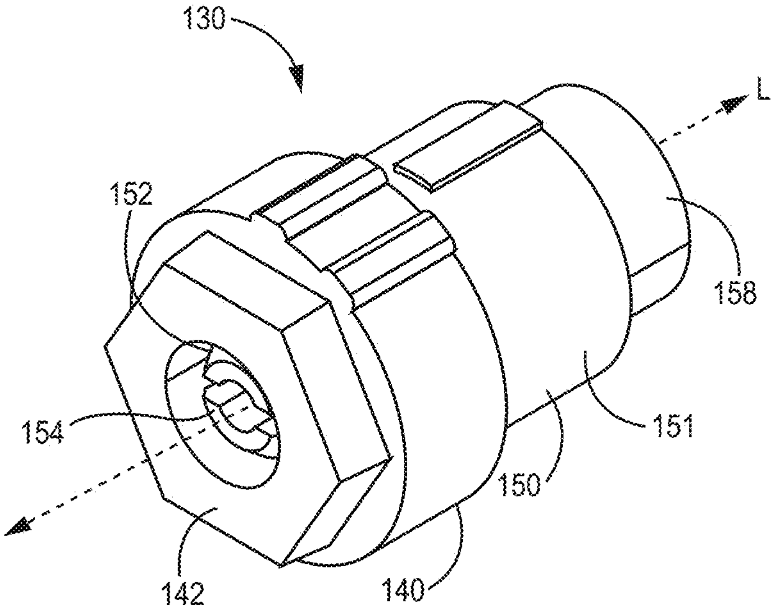
FIG. 2 is an example first endcap assembly of a sensor device consistent with FIG. 1.
Figure 3:
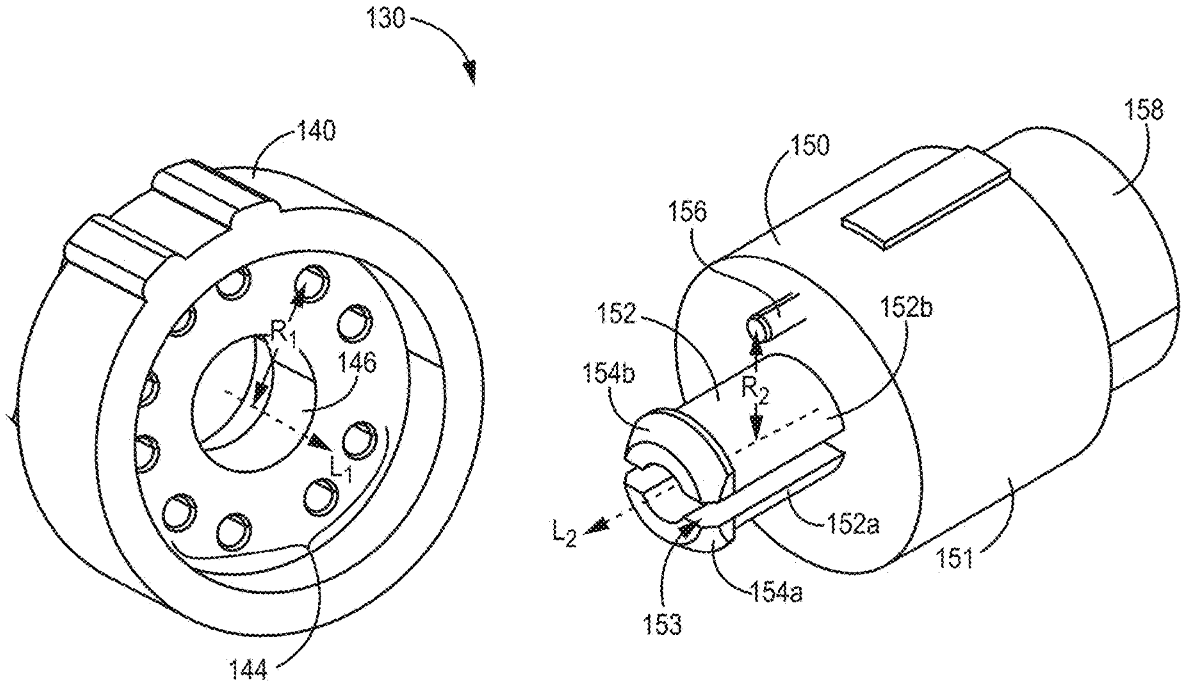
FIG. 3 is a disassembled perspective view of an example first endcap assembly consistent with FIG. 2.
Figure 4:
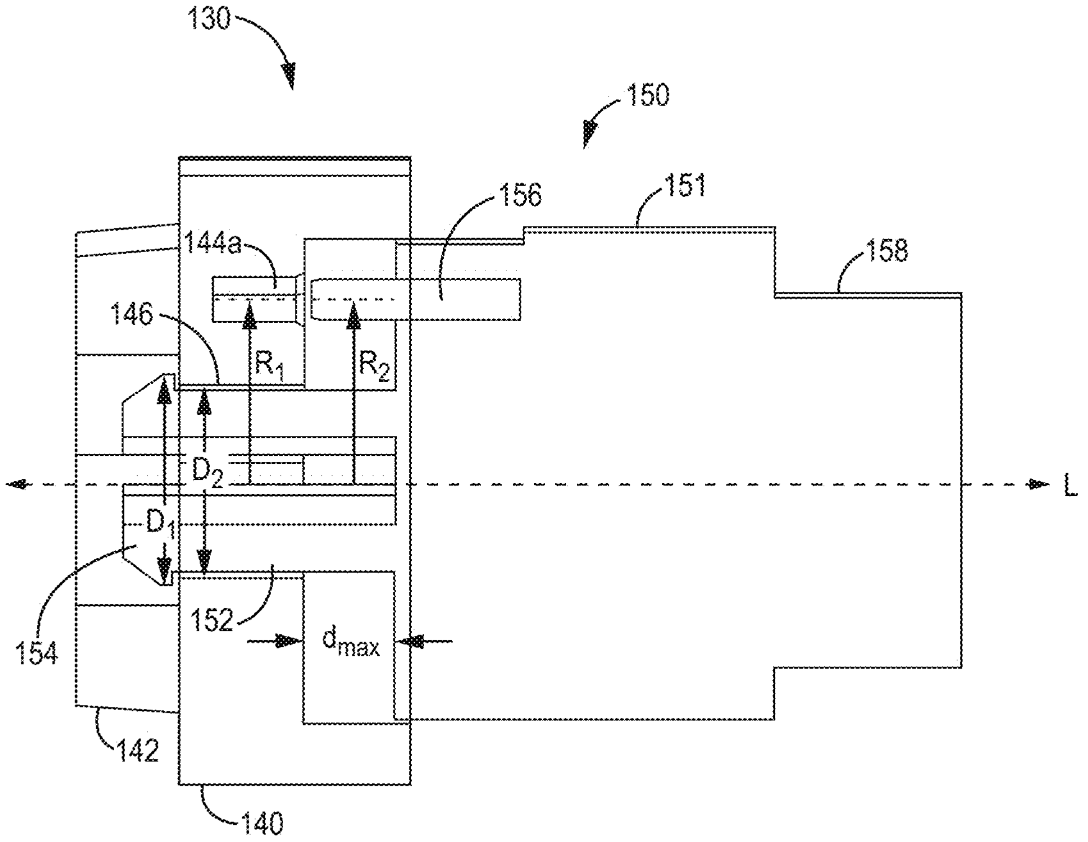
FIG. 4 is an example cross-sectional view of an example first endcap assembly consistent with FIG. 1 in a first position.
Figure 5:
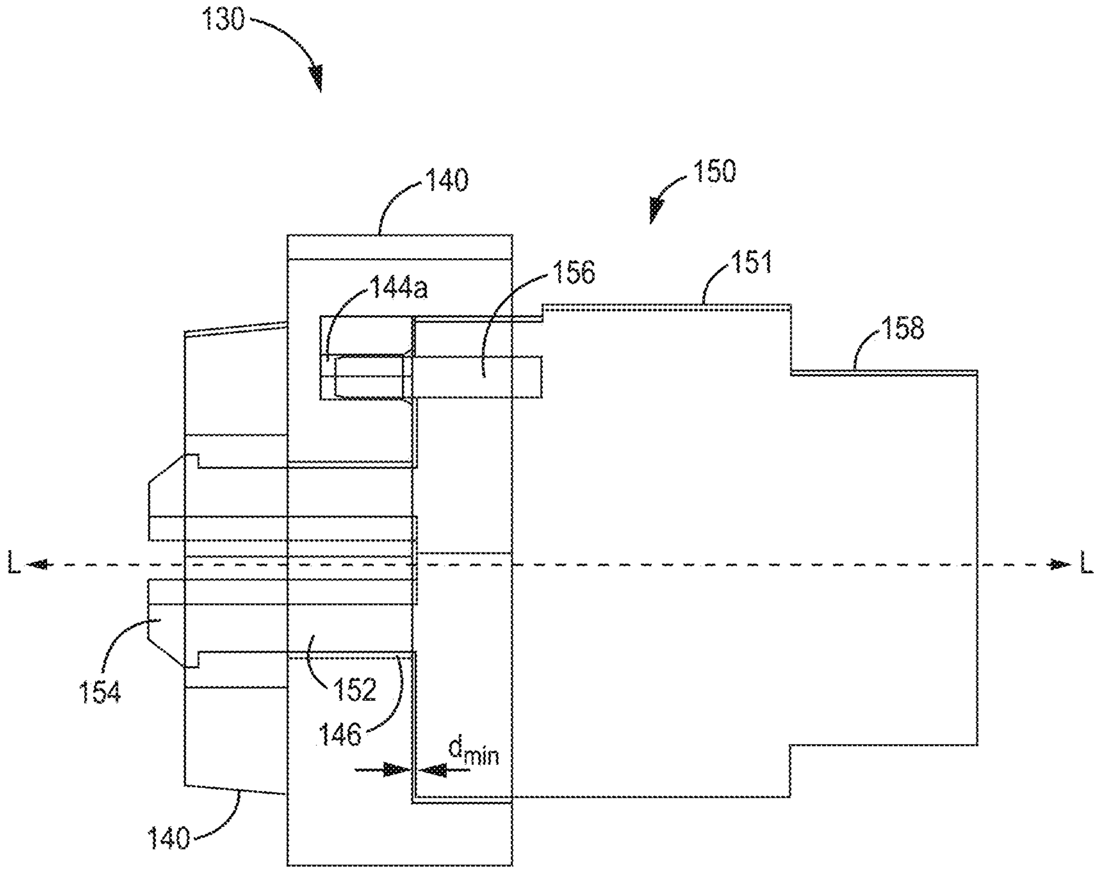
FIG. 5 is an example cross-sectional view of an example first endcap assembly consistent with FIG. 1 in a second position.

FIG. 2 is a perspective view of an example first endcap assembly 130 consistent with a sensor device of FIG. 1, where the intermediate component 140 and the first endcap 150 are components of the first endcap assembly 130. FIG. 3 is a disassembled perspective view of an example first endcap assembly 130 consistent with FIG. 2. FIG. 4 is a cross-sectional view of the first endcap assembly when the first endcap and the intermediate component are in a first position relative to each other and FIG. 5 is a cross-sectional view of the first endcap assembly when the first endcap and the intermediate component are in a second position relative to each other. Each of these drawings will be referenced with the description here.

Referring first to FIG. 2, the first endcap 150 is configured to be coupled to the first end 112 of the sleeve 110 (see FIG.

1). A sleeve insertion portion 158 is configured to be inserted into the first end 112 of the sleeve 110. In some other configurations the first endcap 150 can be configured to cover the first end 112 of the sleeve 110. In various embodiments the first endcap 150 frictionally engages the sleeve 110. In various additional or alternative embodiments the first endcap 150 is coupled to the sleeve 110 through the use of an adhesive, fasteners (such as screws or bolts), and the like.

The intermediate component 140 is coupled to the first endcap 150 and is selectively rotatable relative to the first endcap 150. In particular, as best visible in FIG. 3, the first endcap 150 has an endcap body 151 and a first axle 152 coupled to the endcap body 151. The first axle 152 extends outwardly from the endcap body 151. The first axle 152 extends along the longitudinal axis L. The intermediate component 140 is rotatably disposed about the first axle 152. More specifically, the intermediate component 140 defines an axle opening 146 that receives the first axle 152.

In the current example, the first axle 152 defines a retaining feature 154 that is configured to retain the intermediate component 140 on the first axle 152. In particular, the retaining feature 154 extends radially outward from a distal end of the first axle 152 and has an outer dimension $D_1$ that exceeds an outer diameter $D_2$ of the axle opening 146 (see FIG. 4), where the outer dimension and the outer diameter are perpendicular to the longitudinal axis L. As such, the intermediate component 140 is rotatably disposed between the endcap body 151 and the retaining feature 154. It is noted that a "distal end" as used herein is defined as an end of the relevant component that is configured to be situated furthest from the sleeve 110 and is distinguished from a "proximal end" that is configured to be situated closest to the sleeve 110.

The intermediate component 140 and the first axle 152 of the first endcap 150 can form a snap fit in various embodiments, where the first axle 152 is elastically compressed to pass through the axle opening 146 and, once through the axle opening 146, the first axle 152 expands to retain the intermediate component 140 on the first axle 152. In the current example, the first axle defines a first portion 152*a*, a second portion 152*b*, and a clearance 153 that separates the first portion 152*a* and second portion 152*b*. The first portion 152*a* and/or the second portion 152*b* are configured to flex towards the clearance 153 and compress to pass through the axle opening 146. Upon passage through the axle opening 146, the first portion 152*a* and second portion 152*b* (and the corresponding retaining features 154*a* and 154*b*) are configured to spring outward, to expand away from the clearance 153, which secures the intermediate component 140 on the first axle 152.

The retaining feature 154*a*, 154*b* is generally configured to retain the intermediate component 140 on the first endcap 150 under normal operating conditions and forces, such as during installation and removal of the sensor assembly 100 from a conveyor line. The retaining feature 154*a*, 154*b* is generally configured to retain the intermediate component 140 on the first endcap 150 absent the application of pressure and force on the intermediate component 140 and the first endcap 150 sufficient to decouple the intermediate component 140 and the first endcap 150. Such a configuration improves handleability of the sensor device 100 during installation, as an intermediate component that is a separate component from the first endcap would need to be manually positioned separately from the rest of the sensor device 100. It will be appreciated that the retaining feature 154*a*, 154*b* can have alternate configurations as well, one of which will be described with reference to FIG. 7, below, and another of which will be described with reference to FIG. 11, below.

The intermediate component 140 is generally linearly translatable in the longitudinal direction $L_1$, $L_2$ along the first axle 152 relative to the endcap body 151. In the current example, the intermediate component is linearly translatable between the endcap body 151 and the retaining feature 154. FIG. 4 depicts the intermediate component 140 in a first linear position relative to the first endcap 150, and FIG. 5 depicts the intermediate component 140 in a second linear position relative to the first endcap 150. The first linear position can define a particular maximum linear distance $d_{max}$ between the intermediate component 140 and the first endcap 150 and the second linear position can define a minimum linear distance $d_{min}$ between the intermediate component 140 and the first endcap 150. In the first linear position relative to the endcap body 151 (FIG. 4), the intermediate component 140 is freely rotatable about the longitudinal axis L. In the second linear position relative to the endcap body 151 (FIG. 5), the intermediate component 140 has a fixed orientation about the longitudinal axis L.

As best visible in FIG. 3, the intermediate component 140 and the first endcap 150 mutually define an orientation locking structure 144, 156 that selectively engages when the intermediate component 140 is in the second linear position (as depicted in FIG. 5) and is disengaged in the first linear position (as depicted in FIG. 4). In this example, the orientation locking structure 144, 156 is defined by mating features on the intermediate component 140 and the first endcap 150. The orientation locking structure 144, 156 can disengage when the intermediate component 140 is in the first linear position relative to the endcap body 151 (as depicted in FIG. 4).

The orientation locking structure 144, 156 is generally configured to selectively fix the orientation of the intermediate component about the longitudinal axis relative to the endcap body 151. The orientation locking structure 144, 156 can selectively fix the orientation of the intermediate component 140 about the longitudinal axis L (relative to the endcap body 151) to each of a plurality of discrete, fixed orientations about the longitudinal axis L when the intermediate component 140 is in the second linear position relative to the endcap body 151. The orientation locking structure 144, 156 can selectively engage in each of a plurality of fixed orientations about the first axle 152 when the intermediate component 140 is in the second linear position relative to the endcap body 151.

The orientation locking structure 144, 156 can have a variety of different configurations, but in the example associated with FIGS. 2-5, the first endcap 150 defines a first protrusion 156 that extends longitudinally outward from the endcap body 151. The intermediate component 140 defines a series of protrusion receptacles 144 that are each configured to receive the first protrusion 156 (FIG. 3). The series of protrusion receptacles 144 are configured to be rotated into linear alignment with the first protrusion 156. The series of protrusion receptacles 144 are positioned circumferentially about the axle opening 146 and are equidistant from the axle opening 146 and, as such, the protrusions receptacles 144 are in circumferential alignment. Similarly, the series of protrusion receptacles 144 are positioned circumferentially about the axle opening 146 and are equidistant from the longitudinal axis $L_1$.

The first protrusion 156 has a radial position relative to the first axle 152 and/or the longitudinal axis L, and each of the protrusion receptacles 144 have a corresponding radial position relative to the first axle 152 and/or the longitudinal axis L such that the protrusion receptacles 144 are in circumferential alignment with each other and with the first protrusion 156. The first protrusion 156 has a radial distance $R_2$ (see FIGS. 3 and 4) from the longitudinal axis $L_2$ that is equal to the radial distance $R_1$ between each of the protrusion receptacles 144 and the longitudinal axis $L_1$, where the distance is measured based on a center point of the first protrusion 156 and the protrusion receptacles 144.

In the current example, the orientation locking structure 144, 156 is considered engaged when one of the series of protrusion receptacles 144 receives the first protrusion 156, which prevents rotation of the first endcap 150 relative to the intermediate component 140. In the first linear position (FIG. 4) the first protrusion 156 is outside each of the protrusion receptacles 144 such that the intermediate component 140 and the first endcap 150 are rotatable relative to each other. In the current example, in the first linear position, the intermediate component 140 abuts the retaining feature 154. In the second linear position (FIG. 5) the first protrusion 156 is received by the protrusion receptacle **144*a* such that the intermediate component 140 and the first endcap 150 are non-rotatable relative to each other. In this example, in the second linear position, the intermediate component 140 abuts the endcap body 151**.

While the series of protrusion receptacles 144 are currently defined by an inner region of the intermediate component 140 and the first protrusion 156 is currently defined by an inner region of the first endcap 150, other configurations are certainly contemplated. In some embodiments, such as the example endcap assembly 230 depicted in FIG. 7, an intermediate component 240 has a first protrusion 244 that extends longitudinally inward (towards the sleeve 110) and the first endcap 250 defines a series of protrusion receptacles 256 (only one of which is visible in FIG. 7) configured to receive the first protrusion 244. Such an orientation locking structure can be defined by corresponding inner regions of the intermediate component 240 and the first endcap 250. In some embodiments the first endcap and the intermediate component define an orientation locking structure on corresponding outer regions.

Figure 7:
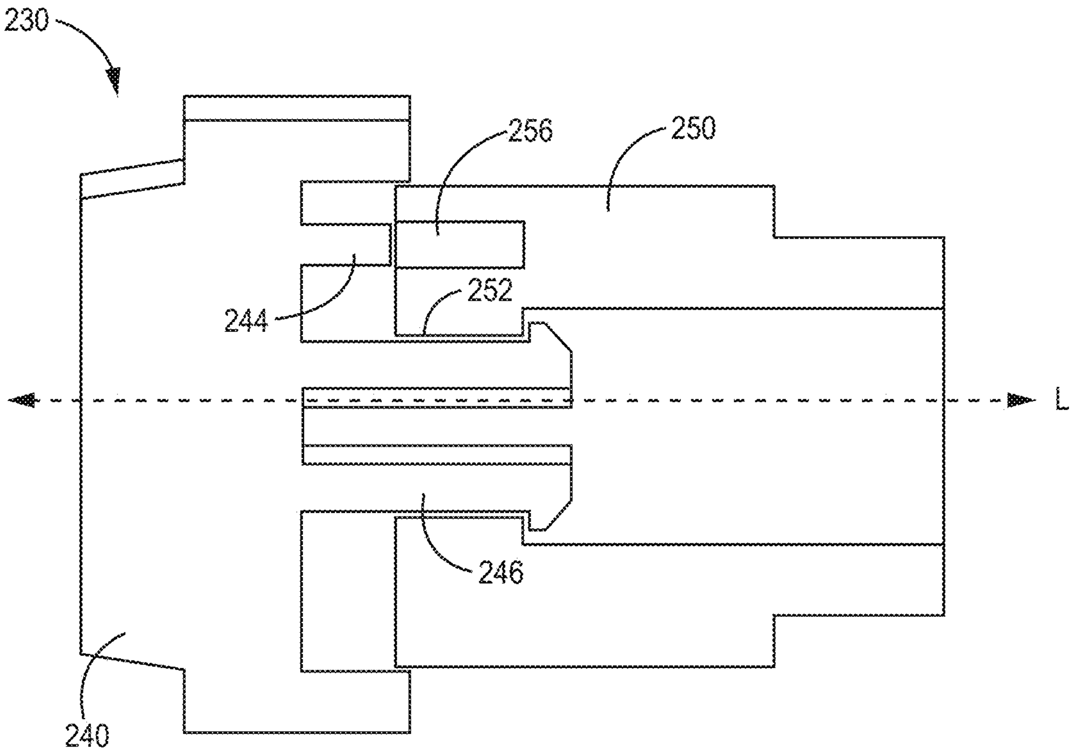
FIG. 7 depicts a cross-sectional view of another example endcap assembly consistent with some embodiments.

Furthermore, in FIGS. 2-5, while the first endcap 150 has the first axle 152 and the intermediate component 140 defines the axle opening 146, in some embodiments, such as the one depicted in FIG. 7, an intermediate component 240 can define a first axle 246 and a first endcap 250 can define the axle opening 252. In such an example, the intermediate component 240 and the first endcap 250 can have similar linear translatability and rotatability relative to each other as has been described in reference to FIGS. 1-5, above.

Figure 6:
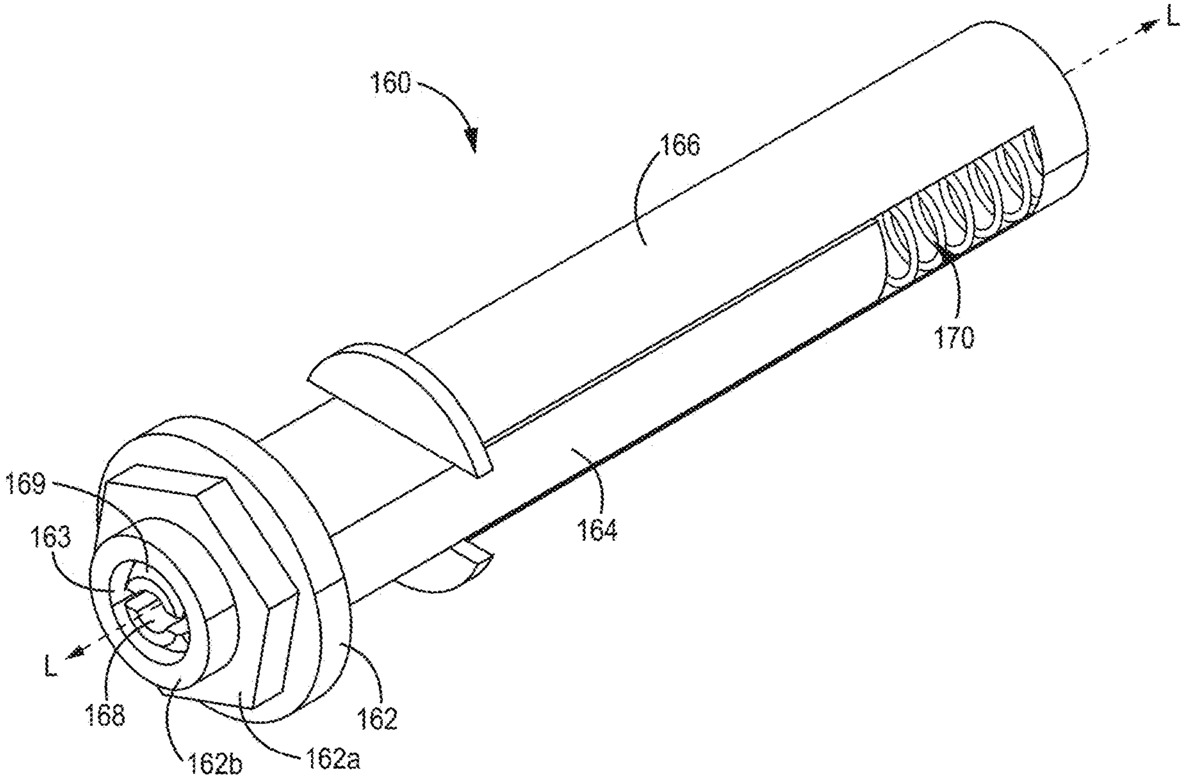
FIG. 6 is a perspective view of an example second endcap consistent with FIG. 1.

FIG. 6 is a perspective view of an example second endcap 160 consistent with FIG. 1. The second endcap 160 is configured to be coupled to the second end 114 of the elongate sleeve 110 (FIG. 1). The second endcap 160 is configured, at least in part, to provide an obstruction through the second end 114 of the sleeve 110. In the current example, the second endcap 160 has a sleeve coupler 166 and a rail coupler 162.

The sleeve coupler 166 can have a variety of configurations, but in the current example is configured to be inserted into the second end 114 of the sleeve 110 (FIG. 1). The sleeve coupler 166 can be configured to frictionally engage the sleeve 110. In the current example, the outer surface of the sleeve coupler 166 frictionally engages an inner surface of the sleeve 110, and frictional forces between those surfaces maintains the position of the sleeve coupler 166 relative to the sleeve 110. In some other embodiments, the sleeve coupler 166 can be configured to cover the second end 114 of the sleeve 110. The sleeve coupler 166 can additionally or alternatively be coupled to the second end of the sleeve through the use of an adhesive, fasteners (such as screws or bolts), and the like. In various embodiments, the sleeve coupler 166 is non-rotatable and non-translatable relative to the sleeve 110.

The rail coupler 162 is generally consistent with the discussions above. In the current example, the rail coupler 162 defines a polygonal protrusion **162*a* extending longitudinally outward from a distal end of the second endcap 160. The polygonal protrusion 162*a* can be configured to engage a corresponding opening in a siderail of a conveyor system. In the current example, the polygonal protrusion 162*a* is hexagonal, but other polygonal shapes could certainly be used, as has been discussed above with reference to the intermediate component 140. In the current example the rail coupler 162 also defines a circular protrusion 162*b* extending longitudinally outward from a distal end of the second endcap 160. The circular protrusion 162*b* is also configured to engage a corresponding opening in a siderail of a conveyor system. Because the rail coupler 162 has a polygonal protrusion 162*a* and a circular protrusion 162*b*, the rail coupler 162 can be coupled to siderails of conveyor systems having differently-shaped openings. In some embodiments one of the polygonal protrusion 162*a* and the circular protrusion 162*b*** can be omitted.

In the current example, the second endcap 160 also has a rod 164 that the rail coupler 162 is coupled to. The rod 164 has a second axle 168 extending longitudinally outward from the rod 164, and the rail coupler 162 is rotatably disposed on the second axle 168. The second axle 168 is configured consistently with the description of the first axle 152, discussed above with reference to FIGS. 2-5. For example, the second axle 168 can define a retaining feature 169 extending radially outward from a distal end of the second axle 168, which is configured to retain the rail coupler 162. The second axle 168 and the rail coupler 162 can be configured to form a snap fit connection, also as discussed above with respect to the first axle 152.

The rod 164 is linearly translatable along the longitudinal axis L relative to the sleeve coupler 166 and, therefore, the sleeve 110. As such, the rail coupler 162 is linearly translatable along the longitudinal axis L relative to the sleeve coupler 166 and the sleeve 110. A spring 170 is compressibly disposed between the rod 164 and the sleeve coupler 166 and, therefore, the spring 170 is compressibly disposed between the rail coupler 162 and the sleeve. The spring 170 can bias the rail coupler 162 in an extended configuration. Such a configuration can facilitate installation of the sensor device 100 between rails in a conveyor line such that when the rail coupler 162 is translated towards the sleeve 110 along the longitudinal axis L, the sensor device 100 can be positioned between the conveyor rails, and when the rail coupler 162 is released, the sensor device 100 lengthens to engage each conveyor rail. The spring 170 can exert sufficient outward force on the conveyor rail to create positive engagement between the sensor device and the conveyor rails.

The spring 170 allows the sensor device to accommodate various distances between siderails of the conveyor. Additionally, to select the radial orientation of the plurality of sensors 120 about the longitudinal axis L of the sleeve 110, a user translates the first endcap 150 away from the intermediate component 140 (by overcoming the biasing force of the spring 170) to introduce a clearance between the first protrusion 156 and the intermediate component 140 (such as depicted in FIG. 4). The first endcap 150 (and therefore the sleeve 110, sleeve coupler 166, and the sensors 120) are rotated relative to the intermediate component 140 to axially align the first protrusion 156 with a particular protrusion receptacle 144*a* of the intermediate component 140. Such rotation is enabled, in part, by the free rotation of the sleeve 110 and sleeve coupler 166 relative to the rail coupler 162. The first protrusion 156 is then inserted into the selected protrusion receptacle 144, which can be facilitated by the spring force when the first endcap 150 is released by the user. Once positioned, the spring 170 exerts a biasing force sufficient to maintain the position of the first protrusion 156 in the particular protrusion receptacle 144*a* of the intermediate component 140.

In an alternative example, the rail coupler can be slidably disposed on the second axle, and a spring can be disposed between the rail coupler and the rod. In some examples, a spring can be disposed between the sleeve and the sleeve coupler, and the sleeve coupler is slidable relative to the sleeve.

Figure 8:
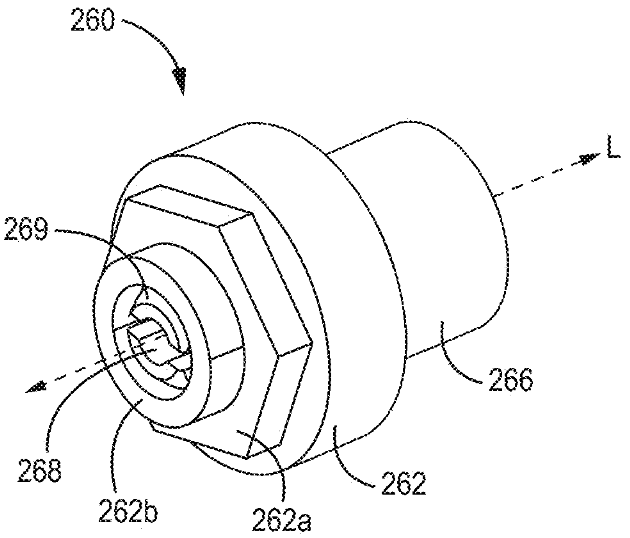
FIG. 8 depicts a perspective view of another example second endcap consistent with some embodiments.

FIG. 8 depicts an alternate example second endcap 260 having a sleeve coupler 266 and a rail coupler 262 and lacking a spring. The second endcap 260 can be coupled to the second end of the sleeve (such as the second end 114 of the sleeve 110 depicted in FIG. 1). The rail coupler 262 has a polygonal protrusion 262*a* and a circular protrusion 262*b* as discussed above with reference to FIG. 6. The sleeve coupler 266 is configured to couple to a second end of a sleeve, as discussed above with reference to FIG. 6. Unlike the example in FIG. 6, here the sleeve coupler 266 has a second axle 268. The rail coupler 262 is rotatably disposed on the second axle 268. Similar to the example of FIG. 6, the second axle 268 defines a retaining feature 269 that is configured to retain the rail coupler 262.

Figure 10:
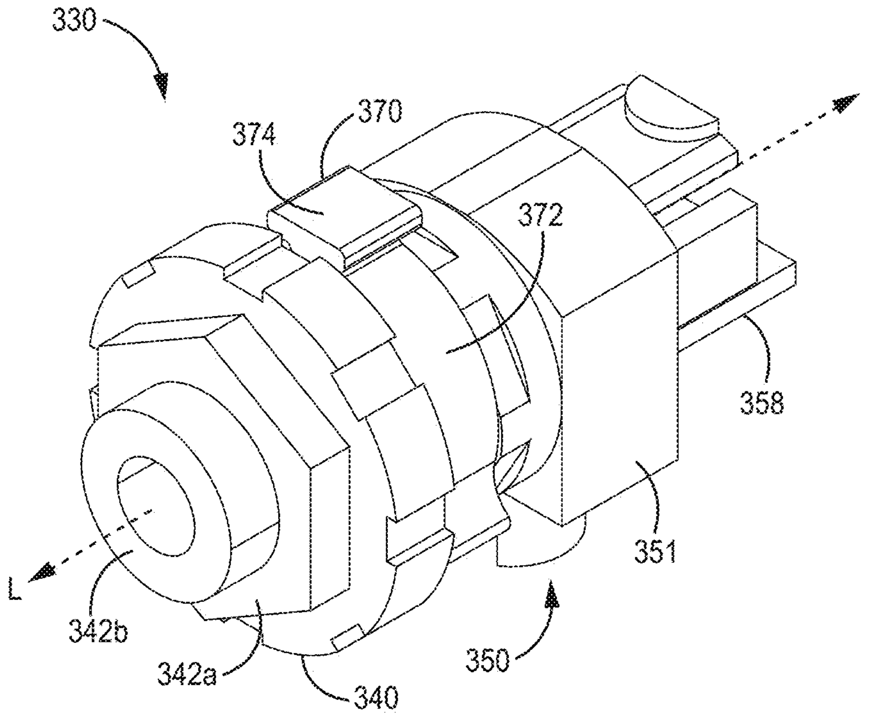
FIG. 10 depicts a perspective view of another example first endcap assembly consistent with some examples.
Figure 11:
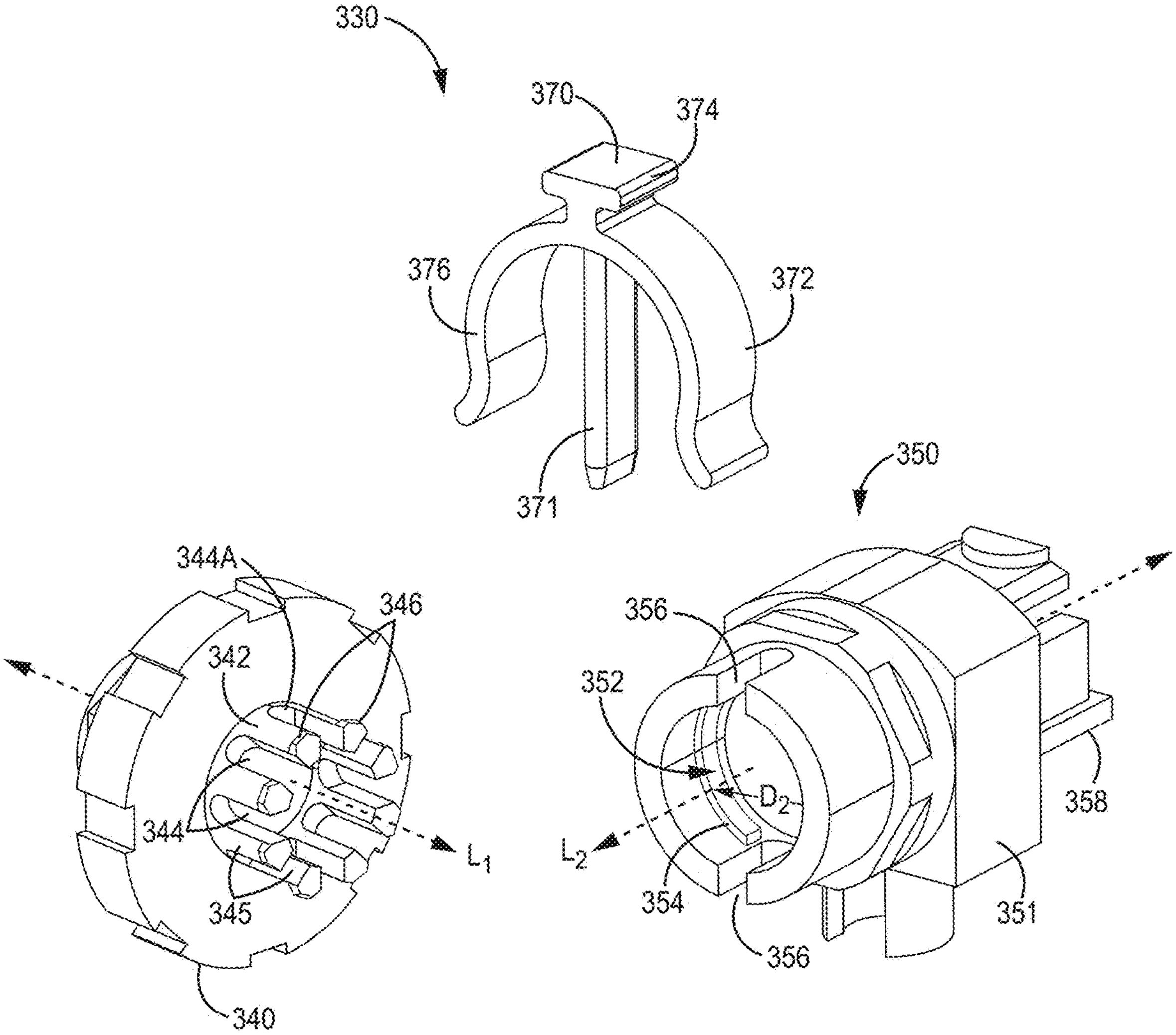
FIG. 11 depicts a perspective view of disassembled components consistent with the example of FIG. 10.
Figure 12A:
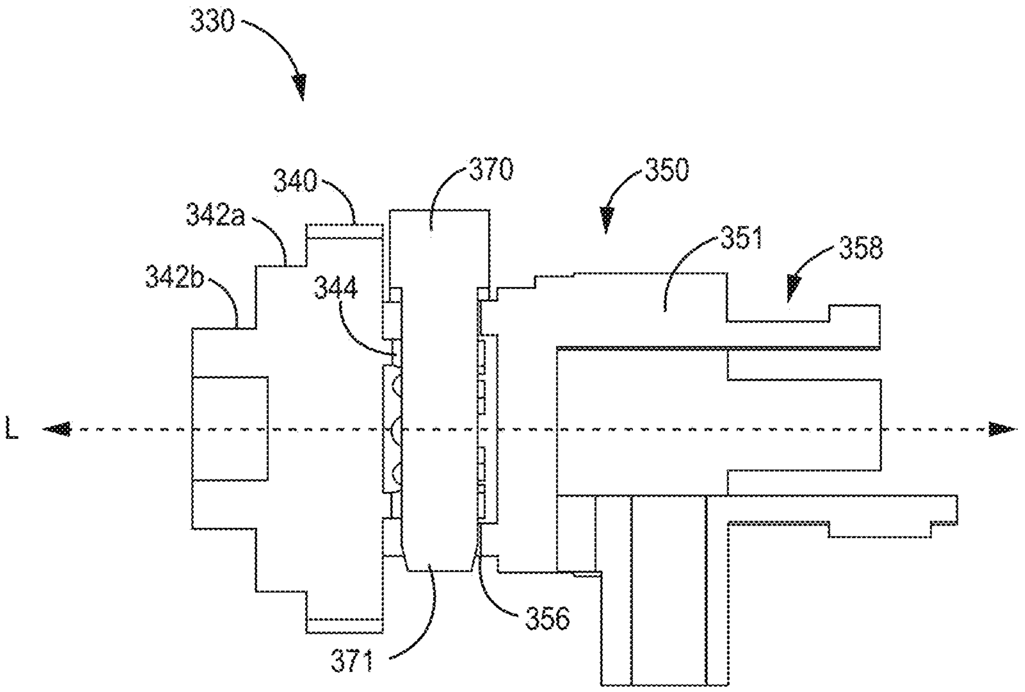
FIG. 12A depicts a cross-sectional view consistent with the example of FIG. 10.
Figure 12B:
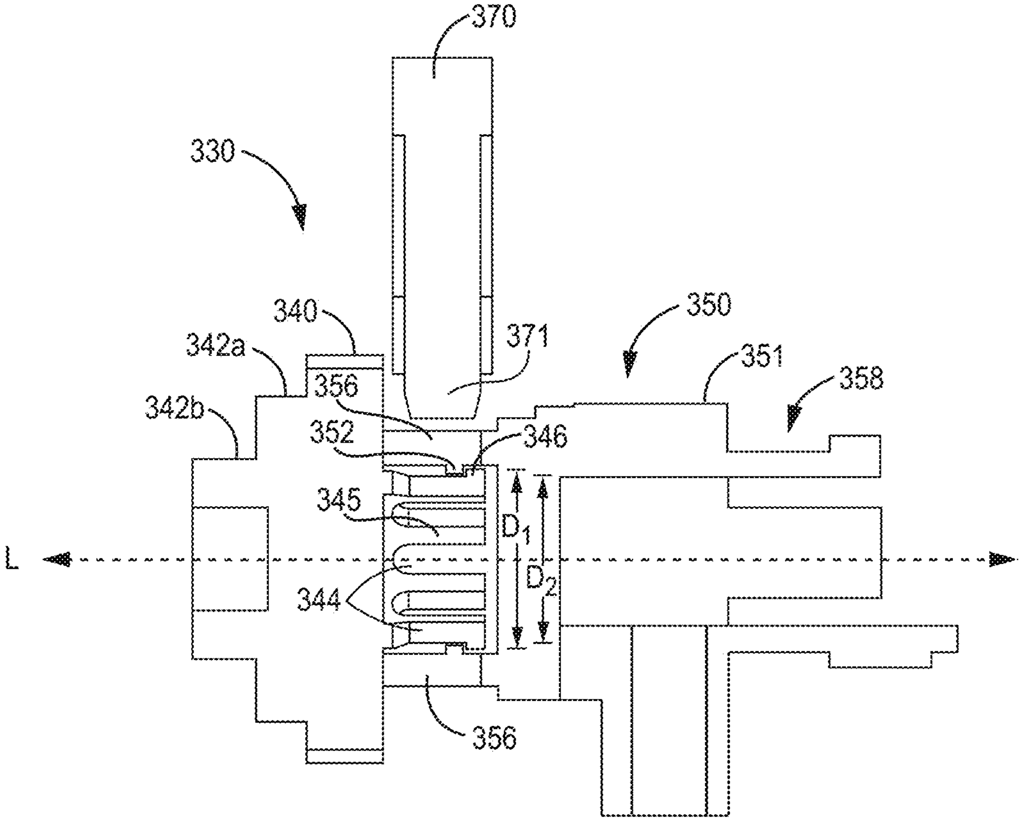
FIG. 12B depicts a partially exploded cross-sectional view of an example consistent with FIG. 12A.

FIGS. 10-12B depicts another example first endcap assembly 330 consistent with some examples. FIG. 10 is a perspective view of such an assembly 330, FIG. 11 is a perspective view of the disassembled components of the assembly, FIG. 12A is a cross-sectional view of FIG. 10, and FIG. 12B is a partially exploded cross-sectional view consistent with FIG. 12A. Each of these drawings will be referenced with the description here. The first endcap assembly 330 has a first endcap 350 having an endcap body 351 and an intermediate component 340 coupled to the first endcap 350.

The first endcap 350 is configured to be coupled to a first end of a sleeve, such as a sleeve consistent with that described above with reference to FIG. 1. A sleeve insertion portion 358 of the first endcap 350 is configured to be inserted into a first end of such a sleeve. In some embodiments, the first endcap 350 can be configured to cover the first end of the sleeve. The first endcap 350 can be coupled to the sleeve through approaches discussed herein above.

The intermediate component 340 is configured to couple the first endcap 350 to a conveyor rail (such as conveyor rail 20*a* depicted in FIG. 9), and can have one or more rail mating features 342*a*, 342*b* (visible in FIGS. 12A-B) that are each configured to mate with a corresponding structure of the conveyor rail (20*a* in FIG. 9, for example). The intermediate component 340 is selectively rotatable relative to the first endcap 350. The intermediate component 340 and the first endcap 350 are coupled to a first axle 342 such that the intermediate component 340 is selectively rotatable about a longitudinal axis L relative to the first endcap 350. In particular, as best visible in FIG. 11, the intermediate component 340 is coupled to a first axle 342 extending along its longitudinal axis $L_1$. The first axle 342 extends longitudinally inward from the intermediate component 340. The first endcap 350 has an endcap body 351 and defines axle opening 352, where the axle opening 352 extends along the longitudinal axis $L_2$ of the first endcap 350. The axle opening 352 is configured to receive the first axle 342. The intermediate component 340 is rotatably disposed about the longitudinal axis L relative to the first endcap 350.

The first axle 342 defines a retaining feature 346 that is configured to retain the intermediate component 340 to the first endcap 350, and the first endcap 350 on the first axle 342. In particular, the retaining feature 346 extends radially outward from a proximal end of the first axle 342 and has an outer dimension $D_1$ (FIG. 12*b*) that exceeds an outer diameter $D_2$ (best visible in FIG. 12*b*) of the axle opening 352, where the outer dimension $D_1$ and the outer diameter $D_2$ are perpendicular to the longitudinal axis L. The axle opening 352 is defined by a circumferential flange 354 having an outer diameter $D_2$ that retains the first axle 342 within the axle opening 352. The first axle 342 is rotatable within the axle opening 352 and, as such, the intermediate component 340 is rotatable about the longitudinal axis L relative to the first endcap 350.

As discussed above with regard to previous example embodiments, the first axle 342 and the axle opening 352 can form a snap fit, where the first axle 342 is elastically compressed to pass through the axle opening 352 and, once through the axle opening 352, the first axle 342 expands to retain the intermediate component 340 on the first axle 342. In the current example, the first axle 342 is cumulatively defined by a series of prongs 345 arranged circumferentially about the longitudinal axis $L_1$ (FIG. 11) and their respective retaining features 346, where a clearance 344 is defined between each of the prongs in the series of prongs 345. Each of the prongs in the series of prongs 345 are configured to flex towards the longitudinal axis $L_1$ to compress to pass through the axle opening 352. Upon passage through the axle opening 352, each prong in the series of prongs 345 are configured to spring radially outward, which secures the intermediate component 340 to the first endcap 350 because the circumferential flange 354 blocks the retaining feature 346 from translating out of the axle opening 352.

Similar to previous examples, the retaining feature 346 is generally configured to retain the intermediate component 340 on the first endcap 350 under normal operating conditions. Such a configuration improves handleability of the sensor device (such as a sensor device depicted in FIG. 1) during installation, as an intermediate component that is a separate component from the first endcap would need to be manually positioned separately from the rest of the sensor device.

In some embodiments consistent with the current example, the intermediate component 340 is not linearly translatable in the longitudinal direction L relative to the endcap body 351. In some other embodiments, the intermediate component 340 can be linearly translatable in the longitudinal direction L relative to the endcap body 351.

Similar to previous examples, here the endcap assembly 330 has an orientation locking structure 371, 344, 356 that is configured to selectively fix the orientation of the intermediate component about the longitudinal axis L relative to the endcap body 351. The orientation locking structure 371, 344, 356 can selectively fix the orientation of the intermediate component 340 about the longitudinal axis L (relative to the endcap body 351) to each of a plurality of discrete, fixed orientations about the longitudinal axis L. The orientation locking structure 371, 344, 356 can selectively engage in each of a plurality of fixed orientations about the longitudinal axis L.

In this example, the endcap assembly 330 has a pin assembly 370, where the pin assembly 370, the intermediate component 340 and the first endcap 350 mutually define the orientation locking structure 371, 344, 356 that is selectively engaged and disengaged. In this example, the orientation locking structure 371, 344, 356 is defined by mating features on the intermediate component 340, the first endcap 350, and the pin assembly 370. Particularly, the pin assembly 370 has a first protrusion 371 that is configured to be mutually received by a first protrusion receptacle 344*a* defined by the intermediate component 340 and a second protrusion receptacle 356 defined by the first endcap 350, which is depicted in FIG. 12A. FIG. 12B shows a partially exploded view with the pin assembly 370 decoupled from the intermediate component 340 and the first endcap 350.

Here the intermediate component 340 defines a series of protrusion receptacles 344 that are each configured to receive the first protrusion 371. The series of protrusion receptacles 344 are positioned circumferentially about the longitudinal axis $L_1$ and are equidistant from the longitudinal axis L. Each protrusion receptacle in the series of protrusion receptacles 344 are in circumferential alignment with the first protrusion receptacle 344*a* such that each protrusion receptacle in the series of protrusion receptacles 344 are configured to be rotated into radial alignment with the second protrusion receptacle 356. When a particular protrusion receptacle, such as the first protrusion receptacle 344*a*, of the intermediate component 340 is rotated into radial alignment with the second protrusion receptacle 356 of the first endcap, the first protrusion receptacle 344*a* and the second protrusion receptacle 356 are configured to mutually receive the first protrusion 371 of the pin assembly 370 to engage the orientation locking structure 371, 344, 356, which fixes the orientation of the intermediate component 340 about the longitudinal axis L relative to the first endcap 350. When the orientation locking structure 371, 344, 356 is disengaged such that the first protrusion 371 is outside of the relevant protrusion receptacles 344, 356, the intermediate component 340 is rotatable about the longitudinal axis relative to the first endcap 350.

In embodiments consistent with the current example, the pin assembly 370 also has an engagement feature 374 and a clamping structure 372. The engagement feature 374 is configured to be grasped (manually or otherwise) by a user to insert and remove the pin 371 to/from the corresponding protrusion receptacles. The clamping structure 372 is configured to frictionally engage one or both of the intermediate component 340 and the first endcap 350 to maintain the position of the pin 371 in the first and second protrusion receptacles 344*a*, 356.

It should be noted that in some embodiments, such as those consistent with the current example, the clearance 344 defined between each of the prongs in the series of prongs 345 defining the first axle 342 are the protrusion receptacles 344. In some other embodiments the clearance can be distinct from the protrusion receptacles.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A sensor device comprising:

an elongate sleeve extending along a longitudinal axis, wherein the elongate sleeve has a first end and a second end;

a plurality of sensors fixed relative to the sleeve;

a first endcap coupled to the first end, the first endcap comprising an endcap body;

an intermediate component selectively rotatable about the longitudinal axis; and an orientation locking structure configured to be engaged to selectively fix the orientation of the intermediate component about the longitudinal axis relative to the endcap body, the orientation locking structure comprising:

a first protrusion extending outward from the endcap body, wherein the first protrusion has a radial position relative to the longitudinal axis; and a protrusion receptacle defined by the intermediate component, wherein the protrusion receptacle is in circumferential alignment with the first protrusion to selectively receive the first protrusion.

2. The sensor device of claim 1, wherein the first protrusion extends longitudinally outward from a distal end of the endcap body.

3. The sensor device of claim 1, wherein the protrusion receptacle is defined by an inner region of the intermediate component.

4. The sensor device of claim 1, further comprising a second endcap coupled to the second end of the sleeve, wherein the second endcap has a rail coupler that is freely rotatable relative to the sleeve.

5. A sensor device comprising:

an elongate sleeve extending along a longitudinal axis, wherein the elongate sleeve has a first end and a second end;

a plurality of sensors fixed relative to the sleeve;

a first endcap coupled to the first end, the first endcap comprising an endcap body;

an intermediate component selectively rotatable about the longitudinal axis; and an orientation locking structure configured to be engaged to selectively fix the orientation of the intermediate component about the longitudinal axis relative to the endcap body, the orientation locking structure comprising:

a first protrusion extending outward from the intermediate component, wherein the first protrusion has a radial position relative to the longitudinal axis; and a protrusion receptacle defined by the endcap body, wherein the protrusion receptacle is in circumferential alignment with the first protrusion to selectively receive the first protrusion.

6. The sensor device of claim 5, wherein the intermediate component is linearly translatable relative to the endcap body along the longitudinal axis, and wherein the intermediate component is freely rotatable about the longitudinal axis when the intermediate component is in a first linear position relative to the endcap body, and the intermediate component has a fixed orientation about the longitudinal axis when the intermediate component is in a second linear position relative to the endcap body.

7. The sensor device of claim 5, wherein the protrusion receptacle is defined by an inner region of the endcap body.

8. The sensor device of claim 5, further comprising a second endcap coupled to the second end of the sleeve, wherein the second endcap has a rail coupler that is freely rotatable relative to the sleeve.

9. A sensor device comprising:

an elongate sleeve extending along a longitudinal axis, wherein the elongate sleeve has a first end and a second end;

a plurality of sensors fixed relative to the sleeve;

a first endcap coupled to the first end, the first endcap comprising an endcap body;

an intermediate component selectively rotatable about the longitudinal axis; and an orientation locking structure configured to be engaged to selectively fix the orientation of the intermediate component about the longitudinal axis relative to the endcap body, the orientation locking structure comprising:

a first protrusion;

a first protrusion receptacle defined by the intermediate component; and a second protrusion receptacle defined by the endcap body, wherein the first protrusion receptacle and the second protrusion receptacle are configured to mutually receive the first protrusion.

10. The sensor device of claim 9, wherein the intermediate component is linearly translatable relative to the endcap body along the longitudinal axis, and wherein the intermediate component is freely rotatable about the longitudinal axis when the intermediate component is in a first linear position relative to the endcap body, and the intermediate component has a fixed orientation about the longitudinal axis when the intermediate component is in a second linear position relative to the endcap body.

11. The sensor device of claim 9, wherein the intermediate component defines a series of protrusion receptacles in circumferential alignment with the first protrusion receptacle.

12. The sensor device of claim 9, further comprising a first axle coupled to the endcap body, wherein the first axle comprises a retaining feature and extends along the longitudinal axis, and wherein the retaining feature extends radially outward from a distal end of the first axle.

13. The sensor device of claim 9, wherein each of the plurality of sensors are linearly aligned relative to each other, linearly aligned relative to the longitudinal axis, or both.

14. The sensor device of claim 9, further comprising a second endcap coupled to the second end of the sleeve, wherein the second endcap has a rail coupler that is freely rotatable relative to the sleeve.

15. A sensor device comprising:

an elongate sleeve extending along a longitudinal axis, wherein the elongate sleeve has a first end and a second end;

a plurality of sensors fixed relative to the sleeve;

a first endcap coupled to the first end, the first endcap comprising an endcap body;

an intermediate component selectively rotatable about the longitudinal axis; and an orientation locking structure configured to be engaged to selectively fix the orientation of the intermediate component about the longitudinal axis relative to the endcap body, the orientation locking structure comprising:

a first protrusion extending outward from the endcap body and a protrusion receptacle defined by the intermediate component, wherein the protrusion receptacle defined by the intermediate component comprises a series of protrusion receptacles defined by the intermediate component; or a first protrusion extending outward from the intermediate component and a protrusion receptacle defined by the endcap body, wherein the protrusion receptacle defined by the endcap body comprises a series of protrusion receptacles defined by the endcap body.

16. A sensor device comprising:

an elongate sleeve extending along a longitudinal axis, wherein the elongate sleeve has a first end and a second end;

a plurality of sensors fixed relative to the sleeve;

a first endcap coupled to the first end, the first endcap comprising an endcap body;

an intermediate component selectively rotatable about the longitudinal axis; and an orientation locking structure configured to be engaged to selectively fix the orientation of the intermediate component about the longitudinal axis relative to the endcap body, the orientation locking structure comprising:

a first protrusion extending outward from the endcap body; and a protrusion receptacle defined by the intermediate component, wherein the intermediate component is linearly translatable relative to the endcap body along the longitudinal axis, and wherein the intermediate component is freely rotatable about the longitudinal axis when the intermediate component is in a first linear position relative to the endcap body, and the intermediate component has a fixed orientation about the longitudinal axis when the intermediate component is in a second linear position relative to the endcap body.

17. The sensor device of claim 16, wherein the first protrusion extends longitudinally outward from a distal end of the endcap body.

18. A sensor device comprising:

an elongate sleeve extending along a longitudinal axis, wherein the elongate sleeve has a first end and a second end;

a plurality of sensors fixed relative to the sleeve;

a first endcap coupled to the first end, the first endcap comprising an endcap body;

an intermediate component selectively rotatable about the longitudinal axis; and an orientation locking structure configured to be engaged to selectively fix the orientation of the intermediate component about the longitudinal axis relative to the endcap body, the orientation locking structure comprising:

a first protrusion extending outward from the intermediate component, wherein the first protrusion extends longitudinally inward from a proximal end of the intermediate component; and a protrusion receptacle defined by the endcap body.

19. The sensor device of claim 18, wherein the intermediate component is linearly translatable relative to the endcap body along the longitudinal axis, and wherein the intermediate component is freely rotatable about the longitudinal axis when the intermediate component is in a first linear position relative to the endcap body, and the intermediate component has a fixed orientation about the longitudinal axis when the intermediate component is in a second linear position relative to the endcap body.

20. The sensor device of claim 18, wherein the protrusion receptacle is defined by an inner region of the endcap body.

* * * * *